(12) United States Patent
Stokking et al.

(10) Patent No.: US 10,181,994 B2
(45) Date of Patent: Jan. 15, 2019

(54) PROBING A NETWORK

(71) Applicants: Koninklijke KPN N.V., The Hague (NL); Nederlandse Organisatie voor Toegepast-Natuurwetenschappelijk Onderzoek TNO, The Hague (NL)

(72) Inventors: Hans Maarten Stokking, Wateringen (NL); Frank Den Hartog, Voorschoten (NL)

(73) Assignees: Koninklijke KPN N.V., Rotterdam (NL); Nederlandse Organisatie voor Toegepast-Natuurwetenschapperlijk Onderzoek TNO, The Hague (NL)

( * ) Notice: Subject to any disclaimer, the term of this patent is extended or adjusted under 35 U.S.C. 154(b) by 48 days.

(21) Appl. No.: 14/653,541

(22) PCT Filed: Dec. 17, 2013

(86) PCT No.: PCT/EP2013/076985
§ 371 (c)(1),
(2) Date: Jun. 18, 2015

(87) PCT Pub. No.: WO2014/095927
PCT Pub. Date: Jun. 26, 2014

(65) Prior Publication Data
US 2015/0350054 A1    Dec. 3, 2015

(30) Foreign Application Priority Data
Dec. 18, 2012    (EP) .................................... 12197669

(51) Int. Cl.
*H04L 12/26*    (2006.01)
(52) U.S. Cl.
CPC .......... *H04L 43/12* (2013.01); *H04L 43/0864* (2013.01); *H04L 43/0888* (2013.01); *H04L 43/10* (2013.01)

(58) Field of Classification Search
CPC ..... H04L 43/10; H04L 43/12; H04L 43/0864; H04L 43/0858; H04L 43/0882; H04L 43/0888; H04L 43/50
See application file for complete search history.

(56) References Cited

U.S. PATENT DOCUMENTS 6,795,401 B1 * 9/2004 Fukuoka ............. H04L 12/2697
370/236
6,813,244 B1 * 11/2004 He ......................... H04L 41/046
370/235
(Continued)

FOREIGN PATENT DOCUMENTS

EP    0 522 211 A1    1/1993

OTHER PUBLICATIONS

Delphinanto, A. et al., "End-to-End Available Bandwidth Probing in Heterogeneous IP Home Networks", Consumer Communications and Networking Conference (CCNC), IEEE, Jan. 9-12, 2011, pp. 431-435.
(Continued)

*Primary Examiner* — Hoang-Chuong Q Vu
(74) *Attorney, Agent, or Firm* — McDonnell Boehnen Hulbert & Berghoff LLP

(57) ABSTRACT

A method is presented of probing a network using probing with a probe packet pair, the pair comprising a first probe packet (L1) and a second probe packet (L2), and wherein L1>L2. The L1 probe packet is transmitted before L2 and the probe packets are arranged to be back-to-back on the last link. Use of the method provides the capacity of the last link in the probed path. The method may be run from a gateway in a network to probe aspects of the network and is suitable for probing a domestic network behind a home gateway. A use for the method is also described.

11 Claims, 4 Drawing Sheets

(56) References Cited

U.S. PATENT DOCUMENTS

| | | | | |
|---|---|---|---|---|
| 7,436,772 | B2* | 10/2008 | Padhye | H04L 43/0858 |
| | | | | 370/235 |
| 8,289,857 | B2* | 10/2012 | Siemens | H04L 47/10 |
| | | | | 370/248 |
| 9,392,475 | B2* | 7/2016 | Rojas-Cessa | |
| 9,501,093 | B2* | 11/2016 | Rojas-Cessa | H04J 3/0658 |
| 2006/0182039 | A1* | 8/2006 | Jourdain | H04L 47/10 |
| | | | | 370/252 |
| 2007/0223388 | A1* | 9/2007 | Arad | H04L 1/24 |
| | | | | 370/252 |
| 2009/0016238 | A1* | 1/2009 | Yu | H04L 41/0896 |
| | | | | 370/253 |
| 2011/0128864 | A1* | 6/2011 | Chan | H04L 43/0864 |
| | | | | 370/252 |
| 2014/0119215 | A1* | 5/2014 | Rojas-Cessa | H04L 43/10 |
| | | | | 370/252 |

OTHER PUBLICATIONS

PCT International Search Report and Written Opinion, PCT International Application No. PCT/EP2013/076985, dated Mar. 17, 2015.

European Search Report, European Patent Application No. 12197669.0, dated May 7, 2013.

Nicolai, F.P., "Capacity Measurement in Small-Scale Heterogeneous Best-Effort IP Networks", M. Sc. Thesis No. PVM 2009-057, Tu Delft, Delft University of Technology, Jul. 2, 2009, 89 pages.

De A Rocha, Antonio A. et al., "An End-to-End Technique to Estimate the Transmission Rate of an IEEE 802.11 WLAN", Proceedings of the 2007 IEEE International Conference on Communications, Jun. 24-28, 2007, pp. 415-420.

* cited by examiner

PROBING A NETWORK

CROSS REFERENCE TO RELATED APPLICATIONS

The present application is a national stage entry of, and claims priority to, PCT/EP2013/076985, filed on Dec. 17, 2013, which claims priority to European Patent Application EP 12197669.0, filed in the European Patent Office on Dec. 18, 2012, both of which are hereby incorporated in their entirety herein by reference.

The invention relates to a method of probing a network using a probe packet pair. The invention also relates to a gateway for a network and a test apparatus configured to probe a remote network.

BACKGROUND TO THE INVENTION

Network probing for capacity is commonly performed using one of many available methods, the ones most relevant to this invention being the Variable Probing Size (VPS) method and the Probe Gap Model (PGM) method.

VPS probing measures round-trip times (RTT) for variable packet sizes, and deduces capacity from the different RTTs measured. VPS uses the IP Time-To-Live parameter to measure individual hops. One major downside of VPS is that it does not work correctly when the path of the probe includes multiple network links, or multiple switches. One result of this is that VPS can underestimate path capacity. The way around this is to break down the network and apply VPS probing to the individual links that make up a path. This increases considerably the pre-knowledge needed to apply the method effectively to a network and the complexity of the method applied in an individual case. However, even this breaks down if switches or other layer-2 or layer-1 devices are included in the network. A domestic network typically includes such devices.

PGM probing uses 2 back-to-back probe packets of the same size. Sending two packets back-to-back means there is no delay in sending between the two packets and the skilled person knows what this means and how to achieve this. As these packets travel across various network links to their destination they will suffer various delays.

Serialization delay in a network is the delay caused by the bandwidth of the medium on which packets are sent. It is the time that is needed to transmit the packet. For a packet of size L (bits) at a link of transmission rate C (bits/s), the serialization delay is equal to L/C. For example, to send a packet of 10,000 bits on a link with a transmission rate of Ser. No. 10/000,000 bits/second, it will take 0.001 second or 1 millisecond to transmit the packet. Serialization delay is dependent on the packet size and is the time it takes to actually transmit a packet.

Queuing delay is the delay suffered by a probing packet because of cross traffic. If multiple data streams are sent across the same network link, they are normally queued and buffered and then transmitted one packet at the time on the network link. This can mean that a probing packet is buffered for a certain amount of time, awaiting its turn to be transmitted. This delay is called queuing delay. Note that such queuing delay can occur in any device on the path between sender and receiver, including the sender itself. Since this delay is dependent on other data packets, it is independent on the probing packet size.

Propagation delay is the time it takes for a packet to physically traverse a network link and is dependent on the medium used for transmission but independent of the packet size. For example, on a 50 meter ethernet cable (CAT-cable), the propagation delay is 50 m/177,000,000 m/s=0.28 μs. Putting a 1500 byte packet (maximum normal ethernet packet size) on a 1 Gbit/s network link causes a serialization delay of 1500*8 bits/1,000,000,000 bits/s=12 μs. The propagation delay in this example is only 2.3% of the serialization delay. Thus, unless packets travel for very long distances or on very high network speeds, the propagation delay is negligible in most cases when performing network measurements.

There is also a processing delay to be taken into account. To enable measurements the probe sender and the probe receiver put a timestamp on a probe packet for 'packet sent' and for 'packet received'. However, the part of the device putting the timestamp on the packet is usually somewhere in the software of the device and is not part of the network interface card itself. Thus, when sending a packet, there is a small amount of time between the time of putting the timestamp on the packet and the actual transmission of the packet on the network. Similarly, there is a small amount of time between the actual receiving of a packet and the time of putting the timestamp on it and this small difference is called processing delay.

A final delay to be taken into account is probe reply delay, the delay caused by a receiver of a probe packet. It is the time taken to receive a probe and sent out a reply.

For determining a path's capacity with PGM, the queuing delay must be zero. Assuming the cross traffic having stochastic properties, a long enough series of probing measurements will yield at least one measurement where the queuing delay is zero. The measurement is identified by taking the minimum delay of probe packets of a number of measurements. If not negligible, the propagation delays of the PGM probes will be equal since both probe packets travel the same links. Furthermore, since the packets are of equal size, processing delays, probe reply delays and serialization delays will also be the same for both packets.

What is different, however, is the serialization delay for each network link. Network links with higher speeds have smaller serialization delays, network links with lower speeds have higher serialization delays. As both probe packets travel across different links, they are dispersed based on the serialization delays. The initial dispersion is caused by the first link, as the probe sender transmits the packets on the network. Each time the probe packets encounter a network link that is faster than at least one previously travelled slower link, the dispersion remains the same. But, each time the probe packets encounter a network link that is slower than any previously travelled link, the dispersion will increase due to the longer serialization delay.

Since the size of the dispersion between the two probe packets at the receiver is determined by the slowest network links, this means that PGM can be used to measure the bottleneck link on the probe path and in fact PGM can only measure the bottleneck link.

Capacity on this bottleneck link can be determined by using the following formula:

$$C = \frac{L}{Ta_{PK2} - Ta_{PK1}} = \frac{L}{D}$$

where dispersion (D) is determined by subtracting the arrival time of the first packet ($Ta_{PK1}$) from the arrival time of the second packet ($Ta_{PK2}$). Capacity is then determined by dividing the size of the probe packets (L) by the dispersion.

The most advanced variety of PGM is described, for example, in Delphinanto, A. et al, "End-to-end available bandwidth probing in heterogeneous IP home networks", Consumer Communications and Networking Conference (CCNC), 2011 IEEE, pp. 431-435, 9-12 Jan. 2011. This paper shows that PGM can also be used to determine bottleneck link speeds in heterogeneous networks consisting of links differing in speeds and medium, for example wired links and wireless links etc. The paper also shows that PGM can be performed with a separate source and receiver, but can also be performed using round-trip probes, for instance by probing with ping packets. The packets are of the same size in the forward and reverse direction.

Using PGM in a round-trip fashion does have a number of implications to keep in mind. Often, for round-trip measurements the popular Ping, i.e. ICMP request and reply, is used. An ICMP request and its reply are of similar size. When the network is symmetrical, i.e. the bandwidths on the links on the forward path are equal to the bandwidths on the links on the reverse path, using ICMP requests has no influence on the outcome, in other words the resulting bottleneck capacity is the same as if it were measured in a one-way PGM measurement. But, in case of asymmetric links, i.e. forward and reverse bandwidth being different, this does have an influence. In case of asymmetric links, the bottleneck link is in either one or the other direction. Actually, using ICMP requests in this way does not show if the network is symmetric or not, it only gives you the capacity of the bottleneck link.

The other much used probe packet, is an UDP packet to a so-called unused UDP port. Such an UDP packet will cause an ICMP "destination port unreachable" reply. Normally, the size of the UDP packet is chosen as large as possible, as this maximizes the size of the serialization delay which will lead to maximum achievable accuracy. The ICMP reply is a small-sized packet. Any serialization delay for the ICMP reply will be much smaller than the serialization delay of the probe packet on the bottleneck in the forward direction. Only on extremely asymmetric networks might this cause a problem if the serialization delay of the ICMP replies is larger than the serialization delays of the probe packets on the bottleneck link. As a result, probing with UDP generally yields the bottleneck link capacity in the forward direction only, irrespective of whether the measurement is performed using a one-way or round-trip.

Thus the skilled person knows that PGM determines bottleneck link capacity on a path because the probe packets are dispersed by the bottleneck link, but will not allow measurement of the capacities of other, non-bottleneck, links in the probing path. Modern probing methods attempt to derive as much information as possible about the network being probed, however, there are always gaps in the extracted information.

U.S. Pat. No. 6,795,401 B1 describes a bandwidth measuring method for a packet switching network in which a bandwidth of a packet switching network includes a plurality of nodes for packet switching connected mutually is measured, the method includes a procedure in which a plurality of test packets which at least include two test packets having different packet length are fed to the packet switching network so that in the two test packets, the test packet having a long packet length and the test packet having a short packet length are successive in this order, and a procedure in which a receiver receiving each test packet determines an immediately former bandwidth based on the difference in the reception completion timing thereof. This method has some disadvantages: for determining the packet sizes, the link speeds are required to be known. Furthermore, in case of multiple bottleneck links the method does not always work correctly.

It is a problem to find out as much as possible about the network being probed.

SUMMARY OF THE INVENTION

The invention is described in the claims.

A method is described of probing a network comprising at least one network path, the network path comprising one or more network links, using a probe packet pair, the pair comprising a first probe packet L1 and a second probe packet L2, in which the size of probe packet L1 is greater than the size of probe packet L2. The method comprising transmitting L1 and L2 over the network path and wherein L1 is transmitted before L2 and further wherein L1 and L2 are arranged to be back-to-back on the last link of the network path.

This method provides the capacity of the last link in the probe path, regardless of whether it is a bottleneck or not, and therefore provides more information about the network being probed. This extends radically the information that can be extracted from a network. As would be known by the skilled person, this method may also be used to measure available bandwidth of the last link in the probe path.

The method may be used with a series of probe packet pairs to minimize the effect of queuing delay.

The probing is done using for example ICMP echo requests, known sometimes as a ping, where the ICMP echo replies sent by the receiver are the same size as the ICMP echo requests sent by the probing source.

The condition of back-to-back is satisfied if the second probe packet is transmitted on the network link without delay after the transmission of the first probe packet on that network link.

In an advantageous embodiment further probe pairs may be transmitted in which the size of L2 is gradually reduced in the further probe pairs until the outcome is the same or does not change anymore. In other words, further probe pairs are transmitted and the size of L2 is gradually reduced in the further probe pairs until two probe pairs produce the same outcome. At that point, the probe packets are back-to-back on the last link. The person skilled in the art will understand that it is also possible to start with L2 being the smallest possible size and gradually increasing the size of L2 until two probe pairs do not produce the same outcome anymore. The last packet size where two probe pairs produce the same outcome is where the ratio between the network speeds is exactly equal to the ratio between the packet sizes in this second embodiment. If the packet size of L2 becomes larger, the packets will not be back-to-back on the last link.

In another embodiment, transmitting further probe pairs wherein the size of L2 is varied may be used to verify the validity of a capacity measurement using a larger packet first probing method.

In a further advantageous embodiment further probe pairs are transmitted until the outcome is the same for consecutive measurements.

In another advantageous embodiment further probe pairs are transmitted and the size of L2 is varied between its minimum and maximum value in any order until a maximum value of the outcome is found.

In a particularly advantageous embodiment L1 is significantly larger than L2.

Preferably, the condition that the size of probe packet L1 is greater than the size of probe packet L2 is satisfied if the length of probe packet L1 is greater than the length of probe packet L2.

In an advantageous embodiment L1 is approximately the size of the smallest Maximum Transfer Unit, or MTU, found in the network path. For example the size of L1 is the size of the MTU of the network technology used in the links, which would be for example 1500 bytes for Ethernet network links.

In a particularly advantageous embodiment the network comprises a gateway device and the probing is performed from the gateway. However the method may be performed from any other device in the network, for example a pc or other computing device.

The method is particularly advantageous when the network is a small network and in particular a domestic network or home network, as it would for example allow complete probing of, say, a 3-link network path. A typical domestic network often contains switches but is often limited to a maximum of 3 links, this probing method is especially useful in such an environment.

In a particularly useful embodiment the probing is controlled remotely from outside the network.

A further method by which the method of the invention may be practically used is also described. This comprises transmitting a pair of probes, L1 and L2, into the network according to the method, and then further decreasing the size of the second probe packet L2 and repeating the measurement until the outcomes of two measurements are the same. The probe packets L1 and L2 are then back-to-back on the last link. The decrease of the size of the second probe can be done gradually. In a particularly advantageous embodiment the method is repeated until the outcomes of two consecutive measurements are the same. The probe packets are then back-to-back on the last link.

A further method by which the method of the invention may be practically used is also described. Here a pair of probes, L1 and L2 are transmitted into the network and the size of L2 is varied between its minimum and maximum value in any order until a maximum value of the outcome is found. Essentially the use of the method comprises varying the size of the second probe packet L2 in any desirable order, and finding the maximum of the capacities measured in this series.

The method of the invention is advantageously performed from a gateway in a network comprising at least one network path, the network path comprising one or more network links. Advantageously the gateway is configured to probe a network path using a probe packet pair, where the probe pair comprises a first probe packet L1 and a second probe packet L2, and wherein the size of L1 is greater than the size of L2. The gateway is configured to transmit L1 and L2 over the network path and to transmit L1 before L2 and further to arrange L1 and L2 to be back-to-back on the last link of the network path.

Alternatively the method may be performed from a test apparatus configured to probe a remote network through a gateway. The gateway is comprised in the network and resides in network terms on the edge of the network and is typically accessible through the internet. The test apparatus is configured to probe the network comprising at least one network path, the network path comprising one or more network links via the gateway using a probe packet pair, the probe pair comprises a first probe packet L1 and a second probe packet L2, in which the size of L1 is greater than the size of L2. The test apparatus is configured to transmit L1 and L2 over the network path and to transmit L1 before L2 and further to arrange L1 and L2 to be back-to-back on the last link of the network path. The test apparatus may be a server, or a computer, or a standalone test apparatus connected to the internet and programmed to perform the method of the invention, or may be a software program situated on a server, computer or separate apparatus.

Alternatively the method may also be performed from any other device in the network comprising the network route. The method may be worked, for example, from a computer or other computer device connected into the network, by software on such a device or also from a hand held device connected temporarily into the network. Advantageously the device is configured to probe a network path in the network using a probe packet pair, where the probe pair comprises a first probe packet L1 and a second probe packet L2, and wherein the size of L1 is greater than the size of L2. The device is configured to transmit L1 and L2 over the network path and to transmit L1 before L2 and further to arrange L1 and L2 to be back-to-back on the last link of the network path.

The use of the method is advantageously performed by either a gateway or a test apparatus in the internet and able to access the network through a gateway in the network. The test apparatus may be a server, or a computer, or a standalone test apparatus connected to the internet and programmed to perform the method of the invention, or may be a software program situated on a server, computer or separate apparatus.

The invention allows the user to derive information about the capacity of the last link in the network path. If the observed capacity is equal for any L2 smaller than a certain threshold value, the probe packets are back-to-back on the last link and the observed capacity is equal to the capacity of the last link in the network path. If the observed capacity maximizes at a given L2 and decreases again at smaller L2, then the capacity of the last link in the network path is larger than or equal to the maximum observed capacity. This is the case when additional delay mechanisms, for example probe reply delay, propagation delay and processing delay, cause non-negligible effects on the dispersion for small L2.

This invention describes the use of a method that includes a probe with two differently sized packets, the larger packet being sent first where the packets are arranged to be back-to-back on the last link. This allows measurement of certain non-bottleneck links in a network path, even when there are switches involved in the network path.

Further embodiments are described in the Figures.

DETAILED DESCRIPTION

Figure 1:
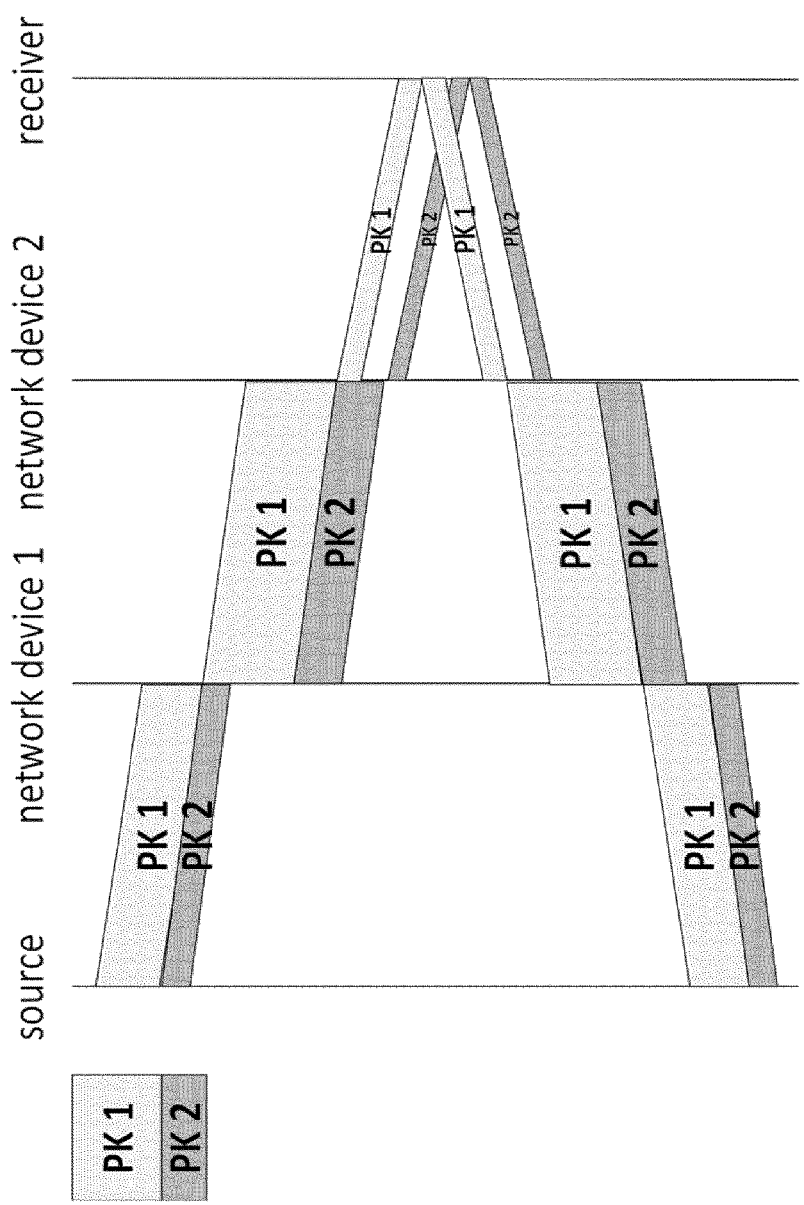
FIG. 1 shows probing, according to the invention, with two probe packets and in which the larger probe packet is sent first and the probe packets are back-to-back on the last link.

FIG. 1 shows probing, according to the invention, with two probe packets and in which the larger probe packet is sent first and the probe packets are back-to-back on the last link. As is known by the skilled person, time is shown progressing in a downward direction and linking structures represent the signaling between devices. The larger of the two probe packets is PK1 and the smaller of the two probe packets is PK2. As is shown, probing with the larger packet transmitted first will result in the second probe packet always catching up to the first one. The packets can disperse somewhat if a much faster network link follows a slower network link. In this case the right hand link which represents the link between network device 2 and the receiver of the probe packets is a much faster network link than the one previously, representing the network link between network device 1 and network device 2. This dispersion can disappear on later network links.

In an embodiment of the invention two probing packets are sent on the network path with the second packet having a smaller size than the first packet. The packet may be sent back-to-back on to the network path as shown in FIG. 1, but there may also be some cross traffic in between these packets. It is found that the second packet takes less time to travel the different links in the network. This is because it suffers a lower serialization delay. Therefore the second packet stays directly behind the first packet during the journey. If the packets become dispersed, the second packet catches up to the first packet so it finally will be back-to-back on the last link. This is shown graphically in FIG. 1.

If the second packet is back-to-back with the first, and larger, packet on the final link, the method allows determination of information about the capacity of the final link. The least information that can be obtained is if the final link is faster than the bottleneck link or not, in the case when the bottleneck link is known, e.g. by performing a regular PGM measurement first. The most information that can be obtained is the capacity of the final link, or a lower boundary of the capacity.

The probing is done using for example ICMP echo requests, where the ICMP echo replies sent by the receiver are the same size as the ICMP echo requests sent by the probing source.

In regular PGM, with two equally-sized packets sent back-to-back, the dispersion between the arrival times of the two probe packets is caused by the bottleneck link. In this new probe method we find that the dispersion is largely, and in the best case completely determined on the last link due to the second probe packet being smaller than the first probe packet.

In a particularly advantageous use of the invention a number of probes are used and the minimum dispersion of the number of probes is determined. This accounts for the effect of cross traffic.

Figure 2:
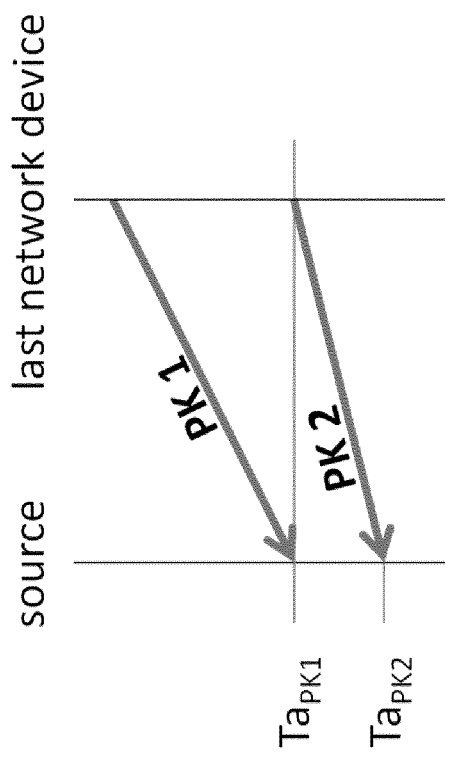
FIG. 2 shows the last link in a larger-packet-first probe according to the invention.

FIG. 2 shows the last link in a larger-packet-first probe according to the invention. Here, the second probe packet will depart on the last link as soon as the first probe packet arrives. In other words they are back-to-back on the last link. Both the arrival time of the first packet, $Ta_{PK1}$, and the arrival time of the second packet, $Ta_{PK2}$, are recorded. Because the second packet is back-to-back with the first, the arrival time of the first packet from the final link is the departure time of the second packet on the final link. If we make an assumption that the propagation delay of the first packet on this final link is negligible for all practical purposes, and we also assume that the processing delay between packet reception and packet time stamping at the source is the same, or the difference is negligible, for both probe packets, then the capacity of the final link is:

$$C = \frac{L2}{\min_{[i=1 \ldots n]} [Ta_{PK2(i)} - Ta_{PK1(i)}]}$$

where L2 is the size of the second probe packet. L1, the size of the first packet, is not used in this formula, because the first packet is only used to delay the second on the last link. This method may be used irrespective of the number of links that are in the path between source and receiver. More links may allow for cross traffic to come in between the first and second probe packet, but as long as the second packet has the chance to catch up with the first packet in time, this is not a problem.

When using ICMP echo requests, this larger-packet-first method can be used to measure the downstream capacity of the link closest to the source of the probe. The same method may be performed using UDP probe packets to an unused UDP port. When using a PGM method with UDP probe packets, it is assumed that the probe replies (in the form of ICMP destination port unreachable packets) are so small that they hardly suffer any delay on the return path. The difference between the arrival times of these probe replies is then equal to the difference in arrival time of the probe packets at the receiver of the probe. Using UDP probes, the larger-packet-first method allows to measure the upstream capacity of the last link on the path to the probe receiver. This requires that the first and second probe packets are sent back-to-back on this last link on the path. By using UDP packets for a round-trip measurement, actually the last link before the receiver is the final link for which capacity is derived, since the probe reply packets are of a different size than the actual probe packets. The path back from receiver to source can therefore not be considered to be part of the path to be probed by the probe packets. Since the probe reply packets are of a very small size, the measurement can still be based on the arrival times of the probe reply packets in the source (so after traversing the round-trip), since no additional dispersion will occur due to the small size of these probe reply packets. The same result (information about the capacity of the last link on the path to the probe receiver) is obtained when using any type of probe packet (UDP, TCP, ICMP, . . . ) in a one-way measurement.

Figure 3:
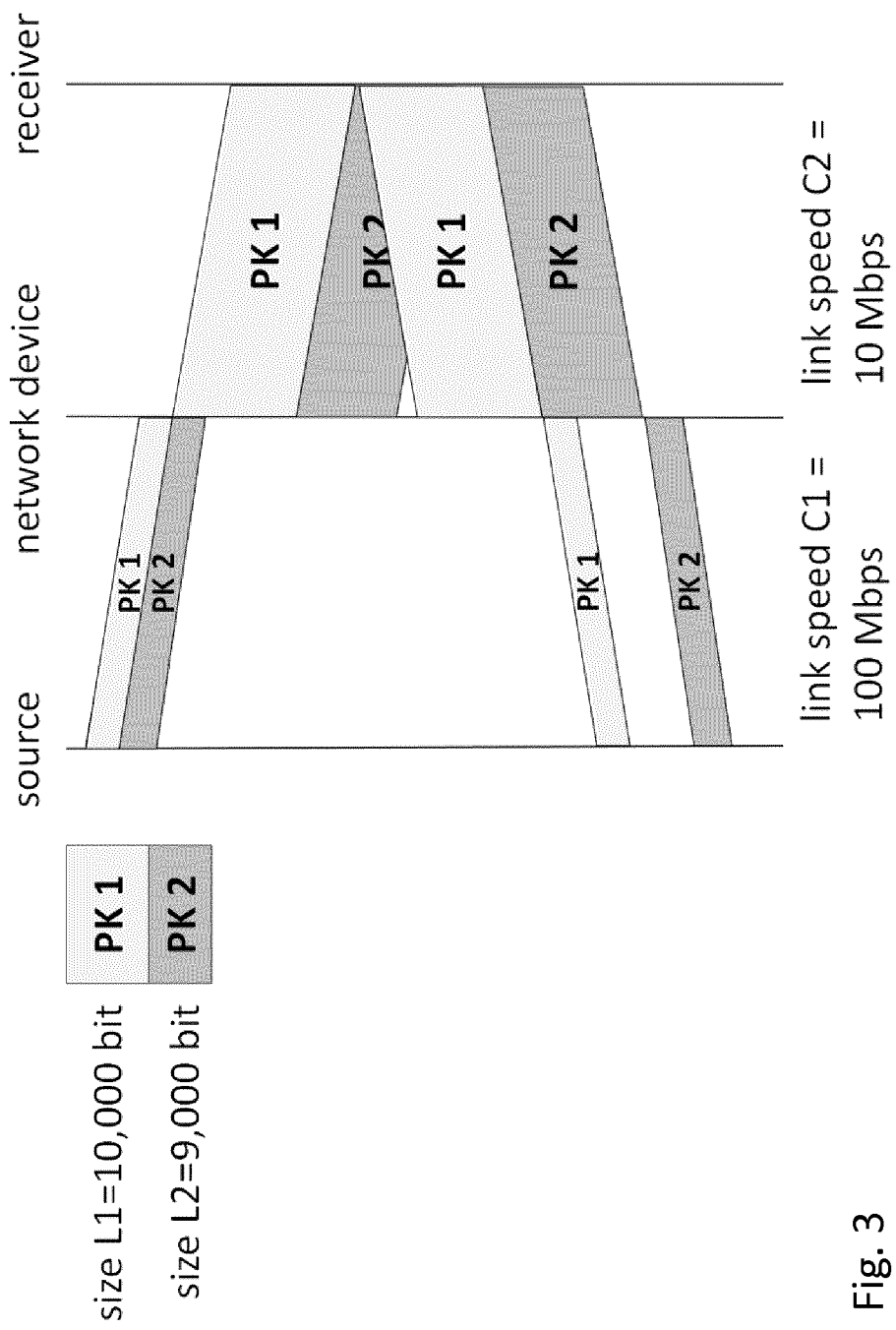
FIG. 3 shows an embodiment of the invention.

FIG. 3 shows an embodiment of the invention which shows that when probing with the known larger-packet-first method, it is not always the case that the two probe packets are back-to-back on the last link. FIG. 3 shows that if the first link is relatively fast, i.e. 100 Mbps, and a second link is relatively slow, i.e. 10 Mbps, the two probes may not be back-to-back on the final links. This will depend on the ratio between the two network speeds and the ratio between the two probe sizes. If the ratio between the two network speeds is the same or smaller than the ratio between the two probe packet sizes, the packets will be back-to-back on the final link.

However, in the case shown in FIG. 3:

$$\frac{C1}{C2} \geq \frac{L1}{L2}$$

Where C1 is the speed of the last link and C2 is, in this case, the speed of the second to last link. In the example, the ratio between the two network speeds is 100:10 or 10:1. The ratio between the two packet sizes is 10,000:9,000 or 10:9. The ratio between the two network speeds is not the same or smaller than the ratio between the two packet sizes, hence the packets are not back-to-back on the final link.

In general, if the final link is the bottleneck link, probe packets will be back-to-back even if they are the same size. If the final link is not the bottleneck link, having a smaller sized second probe packet can make it catch up with the first probe packet, depending on the ratios of the probe packets and the network speeds. Fortunately, it is possible to test if the probe packets are back-to-back on the final link.

Therefore when using the method of the invention, packets are back-to-back if the ratio of the network speeds is the same or smaller than the ratio between the packets sizes. Note that it is not required to know the network speeds in advance. The outcome of the measurement itself is independent of the sizes of the probe packets. When varying the ratio between the two packet sizes, the outcome of the measurement will remain the same if in the different cases the packets are back-to-back on the final link. Thus, if one performs a measurement with two different ratios of packet sizes, and both ratios are larger than the ratio of the network speeds, the outcomes of the two measurements will be very nearly the same. The fact that the outcomes are the same, demonstrates that in both cases the two probe packets were back-to-back on the final link. If the observed capacity maximizes at a given L2 and decreases again at smaller L2, then the capacity of the last link in the network path is larger than or equal to the maximum observed capacity. This is the case when additional delay mechanisms (probe reply delay, propagation delay, and processing delay) cause non-negligible effects on the dispersion for small L2.

Figure 4:
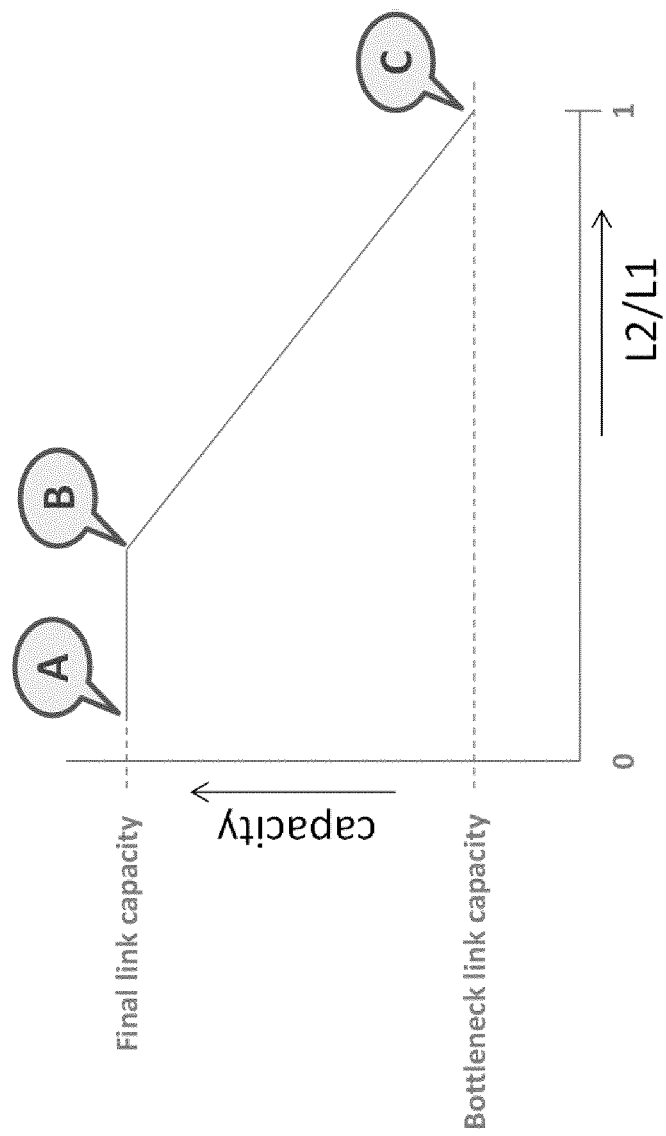
FIG. 4 shows an embodiment of the invention.

FIG. 4 shows the test in a figure. On the horizontal axis is shown the ratio between L2 and L1 and on the vertical axis is shown the measured capacity. L1 is a fixed length, usually the maximum packet size on a network (MTU). There are 3 marked points in the figure. Point A marks the point where L2 is as small as possible. As an example, in an ICMP request this is a request containing no data bits. Point C is when L2 is the same size as L1. If that is the case, regular PGM is performed and hence the bottleneck link is measured, as would be known by the skilled person. Point B marks the point where the ratio between the network speeds is exactly equal to the ratio between the packet sizes.

The test consists of varying the size L2 in such a way that two or more measurements are performed between points marked A and B. Although the size of L2 will be different the outcome will be about the same and thus the packets were back-to-back on the final link. When the final link is the bottleneck link, point B merges with point C, in other words the final link capacity is measured which is the bottleneck link. Note that it is possible that no measurement can be performed, in other words point B can also merge with point A. The ratio between the packet sizes (L2/L1) cannot be infinitely small, e.g. on normal ethernet networks this ratio can be about 0.04 at the smallest. This is because L2 has a minimum size. In theory that is 1 bit. In practice it is the minimum allowed packet size on a given link, e.g. 64 byte for Ethernet. If there are for example two network speeds of 10 Mbit/s and 1 Gbit/s this ratio can be 0.01 at the smallest, and hence no measurements can be performed. The test allows for this, because in this case it is impossible to do two measurements and have the same outcome.

Also note that typically the accuracy of probing increases with increasing probe packet sizes. The larger the packet sizes, the larger the serialization delay to be measured. Additionally, the larger is the serialization delay, the more negligible the other delays or delay differences become. So, the ultimate measurement point is in fact the point marked B.

The invention claimed is:

1. A method of probing a network using a probe packet pair, the network comprising a network path, and the probe packet pair comprising a first probe packet designated L1 and a second probe packet designated L2, wherein the size of L1 is greater than the size of L2, the method comprising:
transmitting L1 and L2 of the probe packet pair over the network path, wherein L1 of the probe packet pair is transmitted before L2 of the probe packet pair, wherein the network path comprises two or more network links; and arranging L1 and L2 to be back-to-back on the last of the two or more links of the network path by transmitting one or more further probe packet pairs, each comprising a first probe packet designated L1 and a second probe packet designated L2, wherein for each of the one or more further probe packet pairs, the size of L1 is greater than the size of L2, and varying, for each successive transmission of a further probe packet pair, a ratio between the two packet sizes in the further probe pair with respect to the ratio of the sizes of L1 and L2 in the probe packet pair until two probe packet pairs from among those transmitted produce the same observed capacity.

2. The method of claim 1, wherein varying a ratio between two packet sizes comprises gradually reducing the size of L2 in the successive transmissions of the further probe packet pairs.

3. The method of claim 1, wherein further probe pairs are transmitted until an observed capacity is the same for consecutive measurements.

4. The method of claim 1, wherein the size of L1 being greater than the size of L2 corresponds to the length of L1 being greater than the length of L2.

5. The method according to claim 1, where L1 is the same size as a smallest Maximum Transfer Unit found in the network path.

6. The method according to claim 1, wherein the network comprises a gateway device and the probing is performed from the gateway device.

7. The method of claim 6 wherein the probing is controlled remotely from outside the network.

8. The method according claim 1, wherein the network is a home network.

9. A gateway for a network, wherein the gateway is configured to probe a network path in the network using a probe packet pair, the probe pair comprising a first probe packet designated L1 and a second probe packet designated L2, wherein the size of L1 is greater than the size of L2, and wherein the gateway comprises:

a processor and instructions that when executed by the processor cause the gateway to carry out operations including:

transmitting L1 of the probe packet pair over the network path, wherein the network path comprises two or more network links; and after transmitting L1 of the probe packet pair, transmitting L2 of the probe packet pair over the network path, wherein the transmissions of L1 and L2 are arranged to be back-to-back on the last link of the network path by transmitting one or more further probe packet pairs, each comprising a first probe packet designated L1 and a second probe packet designated L2, wherein for each of the one or more further probe packet pairs, the size of L1 is greater than the size of L2, and varying, for each successive transmission of a further probe packet pair, a ratio between the two packet sizes in the further probe pair with respect to the ratio of the sizes of L1 and L2 in the probe packet pair until two probe packet pairs from among those transmitted produce the same observed capacity.

10. A test apparatus for probing a remote network, the test apparatus having access to a network by way of a gateway in the network, and the test apparatus being configured to probe a network path in the network via the gateway using a probe packet pair, the probe pair comprising a first probe packet designated L1 and a second probe packet designated L2, wherein the size of L1 is greater than the size of L2, and wherein the test apparatus comprises:
- a processor and instructions that when executed by the processor cause the test apparatus to carry out operations including:
- transmitting L1 of the probe packet pair over the network path, wherein the network path comprises two or more network links; and
- after transmitting L1 of the probe packet pair, transmitting L2 of the probe packet pair over the network path,
- wherein the transmissions of L1 and L2 are arranged to be back-to-back on the last link of the network path by transmitting one or more further probe packet pairs, each comprising a first probe packet designated L1 and a second probe packet designated L2, wherein for each of the one or more further probe packet pairs, the size of L1 is greater than the size of L2, and varying, for each successive transmission of a further probe packet pair, a ratio between the two packet sizes in the further probe pair with respect to the ratio of the sizes of L1 and L2 in the probe packet pair until two probe packet pairs from among those transmitted produce the same observed capacity.

11. A test apparatus configured to probe a network path in a network using a probe packet pair, wherein the probe pair comprises a first probe packet designated L1 and a second probe packet designated L2, and wherein the size of L1 is greater than the size of L2, and wherein the test apparatus comprises:
- a processor and instructions that when executed by the processor cause the test apparatus to carry out operations including:
- transmitting L1 of the probe packet pair over the network path, wherein the network path comprises two or more network links; and
- after transmitting L1 of the probe packet pair, transmitting L2 of the probe packet pair over the network path,
- wherein the transmissions of L1 and L2 are arranged to be back-to-back on the last link of the network path by transmitting one or more further probe packet pairs, each comprising a first probe packet designated L1 and a second probe packet designated L2, wherein for each of the one or more further probe packet pairs, the size of L1 is greater than the size of L2, and varying, for each successive transmission of a further probe packet pair, a ratio between the two packet sizes in the further probe pair with respect to the ratio of the sizes of L1 and L2 in the probe packet pair until two probe packet pairs from among those transmitted produce the same observed capacity.

* * * * *